United States Patent
Foster et al.

[11] 3,888,614
[45] June 10, 1975

[54] APPARATUS FOR PRODUCING A FOAMED RESIN SHEET IN A CURVED DIVERGING EXPANSION ZONE

[75] Inventors: William R. Foster, Wrexham; Durgacharan Sen, Cwmbran; Stanley J. Skinner, Newport, all of Wales

[73] Assignee: Monsanto Chemicals Limited, London, England

[22] Filed: Jan. 17, 1974

[21] Appl. No.: 434,170

Related U.S. Application Data
[62] Division of Ser. No. 192,465, Oct. 26, 1971, Pat. No. 3,810,965.

[30] Foreign Application Priority Data
Nov. 3, 1970 United Kingdom............... 52268/70
Feb. 18, 1971 United Kingdom............... 4900/71

[52] U.S. Cl............................. 425/224; 425/817 C
[51] Int. Cl............................................ B29d 27/00
[58] Field of Search........ 425/4 C, 223, 224, 817 C; 264/53

[56] References Cited
UNITED STATES PATENTS
| | | | |
|---|---|---|---|
| 2,212,770 | 8/1940 | Foster | 425/224 X |
| 3,431,164 | 3/1969 | Gilbert | 425/4 C X |
| 3,624,192 | 11/1971 | McCoy et al. | 425/4 C X |

*Primary Examiner*—R. Spencer Annear
*Attorney, Agent, or Firm*—A. E. Hoffman

[57] ABSTRACT

The present invention relates to an apparatus for extruding a sheet of foamed thermoplastic resin, comprising a slit die orifice communicating with an expansion zone defined by a pair of opposing curved surfaces that may be cooled, one of the surfaces being convex and movable in a direction away from the slit die orifice and the other surface being concave, the curvatures and relative spacing of the curved surfaces with respect to each other being such that the space therebetween is at a minimum proximate the slit die orifice and then progressively increases in a direction away from said slit die orifice to a maximum at the other end of said expansion zone.

9 Claims, 1 Drawing Figure

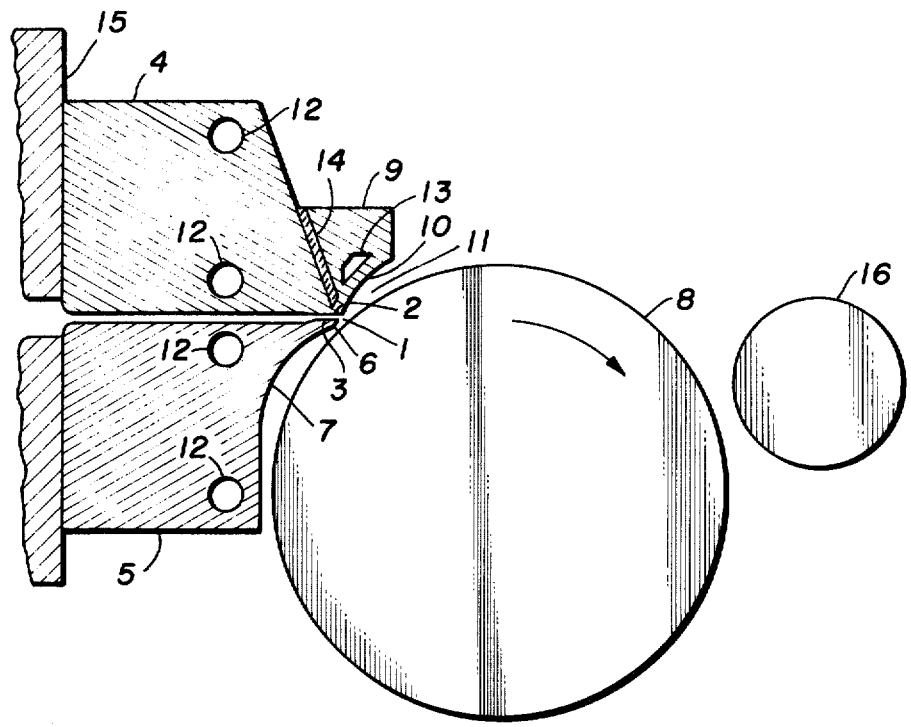

3,888,614

APPARATUS FOR PRODUCING A FOAMED RESIN SHEET IN A CURVED DIVERGING EXPANSION ZONE

This is a division of application Ser. No. 192,465, filed Oct. 26, 1971, now U.S. Pat. No. 3,810,965.

CROSS REFERENCE TO RELATED APPLICATIONS

This application claims the right of priority of British Patent application No. 52268/70 filed Nov. 3, 1970 and British Patent application No. 4900/71 filed Feb. 17, 1971.

BACKGROUND OF THE INVENTION

1. Field of the Invention

This invention relates to producing resin sheet, and particularly to a process for producing a sheet of a foamed thermoplastic synthetic resin by extrusion. The invention also relates to an extrusion apparatus.

2. Description of the Prior Art

The extrusion of a foamed thermoplastic synthetic resin from a slit die gives a sheet that is corrugated in the transverse direction. A number of methods have been proposed for eliminating the corrugations, and in most of these the foamable resin is allowed to expand in a zone formed by a pair of shaping members. However, certain disadvantages attend practical attempts to use such members, for instance the pressures developed in the zone can be high so that it needs to be rigidly constructed and adjustment of the apparatus is in consequence difficult. Moreover, where the sheet produced is a thin one there is a risk of tearing its surface as it passes through the zone, in particular we have found that there is considerable difficulty in designing a zone of this kind that can be used to produce foamed resin sheets of differing thicknesses, densities and resin types while at the same time having a smooth finish on top and bottom surfaces of the sheet.

The present invention provides a design for an expansion zone that represents a considerable improvement in these respects.

SUMMARY OF THE INVENTION

The process of the present invention is one for producing a sheet of a foamed thermoplastic synthetic resin, which comprises extruding a foamable thermoplastic synthetic resin through a slit die orifice into an expansion zone defined by a pair of opposing curved surfaces maintained at a temperature below the extrusion temperature, one of the surfaces being a convex surface that moves in the direction of extrusion and the other surface being concave, such that foaming of the resin occurs as it moves through the expansion zone and the curvatures and relative spacing of the surfaces being such that they contact the expanding and foaming resin and there is produced a foamed resin sheet.

The invention also comprises an apparatus suitable for the extrusion of a sheet of foamed thermoplastic resin, comprising a slit die orifice communicating with an expansion zone defined by a pair of opposing curved surfaces that can be cooled, one of the surfaces being a convex surface that can move in a direction away from the slit die orifice and the other surface being concave, the curvatures and relative spacing of the surfaces being such that when a foamable resin is extruded through the die they contact the expanding and foaming resin and there is produced a foamed resin sheet.

Preferably the sheet produced is flat (which term does not exclude the possibility of embossing it with a suitable design, as explained below), and in this case each surface can conveniently be the locus of a straight line parallel to the slit die orifice and constrained so that the surface has the necessary curvature. Preferably each surface is cylindrical. Suitable arrangements are necessary for the convex surface to move in the extrusion direction, and this surface is preferably that of a roller rotatable about an axis parallel to the slit, although it can for example be a suitable flexible material, particularly an endless belt, movable over a roller or other suitably shaped movable or fixed convex object. The convex surface can move at about the same speed as the extruding resin, but a slightly higher speed is in most instances desirable so that some slipping occurs. A slightly slower speed may be employed but generally this is undesirable because it may lead to leakage of the foaming resin between the convex surface and the body of the extrusion die.

The concave surface may also be movable if desired although this is not usually easy to arrange in practice; one possible method would be to use a belt moving over a fixed concave surface and maintained in contact therewith by the pressure of the foaming resin. However, it is not normally necessary for the concave surface to be movable and preferably it is fixed with respect to the slit die orifice.

DESCRIPTION OF THE DRAWING

An example of an extrusion apparatus according to the invention is shown in vertical cross-section in the drawing, the section being along the center line parallel to the extrusion direction.

A slit die orifice 1 is formed by lands 2 and 3 on a pair of die lips 4 and 5. The lower die lip 5 is cut away at 6 and 7 to make room for a cylindrical roller 8 that can be driven in the direction of the arrow by a variable speed motor (not shown). Integral with the upper die lip 4 is a piece 9 ground away as shown to form a concave cylindrical surface 10. There is thus defined between the roller and the surface 10 an expansion zone 11. Although the radius of curvature of the surface 10 is considerably smaller than that of the roller 8, its axis is higher and closer towards the slit die orifice than the roller's axis, so that in consequence the gap width of the zone increases with the distance away from the slit die orifice. This increase in gap width is at first sharp but becomes more gradual and the surface 10 preferably ends before the gap width starts to decrease again, although such a decrease in gap width can be arranged if desired. Heating or cooling fluid can be passed through channels 12 in the die lips 4 and 5. Similarly, the piece 9 has a fluid channel 13 and a certain degree of thermal independence from the main block of the lip 4 is achieved by means of insulating material 14. The roller 8 is also equipped with means (not shown) for cooling it; for example a stream of cold air can be directed against it from below or it can have a central channel for cooling fluid, the latter method being preferred. The lips 4 and 5 each have provision for bolting them to a die block 15 at the front end of a suitable extruder so that a foamable thermosplastic synthetic resin can be fed between them and then through the slit die orifice 1 into the expansion zone 11. Here foaming and expansion take place and the foaming resin is carried by the surface of the roller into the atmosphere. It continues in contact with the roller before being removed as a sheet via a second roller 16 to a conventional haul-off mechanism (not shown). The roller 16 is not essential but is included to keep the foamed sheet in contact with the roller 8 for a greater proportion of its circumference than would otherwise be consistent with haul-off in an approximately horizontal direction. Such extended contact is desirable to increase frictional drag of the roller 8 on the foamed resin sheet, but is not essential.

The resin is preferably a polymer or copolymer of a vinyl or vinylidene monomer, preferable a hydrocarbon monomer such as for example, ethylene, propylene, butadiene, styrene, vinyltoluene, or α-methylstyrene, or a substituted monomer such as for example, acrylonitrile, vinyl or vinylidene chloride, vinyl acetate, methyl acrylate, methyl methacrylate or ethyl acrylate. The resin can for example be aliphatic, particularly a polyolefin such as polyethylene (low density or high density material) or a copolymer of an aliphatic olefin, such as ethylene or propylene with a substituted monomer as mentioned above. Thus, the resin can for example be a copolymer of ethylene and vinyl acetate. Polypropylene and high density polyethylene are the most preferred aliphatic resins. The process is also applicable to a polyvinylaromatic resin, that is to say a polymer or copolymer of a vinylaromatic monomer, such as styrene, chlorostryrene, vinyltoluene or α-methylstyrene. A copolymer can be one of a vinylaromatic monomer with another olefinic monomer, for example, acrylonitrile, vinyl chloride, vinyl acetate, methyl methacrylate or ethyl acrylate. Toughened polystyrene can be employed, for instance one that has been obtained by modification before or after polymerization with a natural or synthetic rubber. Polystyrene and a copolymer of styrene, butadiene and acrylonitrile (ABS) are the preferred polyvinylaromatic resins. The process of the invention is in fact particularly useful for producing a foamed ABS or polypropylene sheet of good surface finish on both sides.

The resin used in the process is of course foamable, and this means that it is in admixture with a blowing agent which is in general a low boiling substance or a chemical blowing agent. In many instances the agent is a volatile substance and by this it is meant to include volatile liquids as well as substances that are a gas or vapour under normal atmospheric conditions (such as 20°C. and 1 atmosphere pressure), but which while under pressure before extrusion are present in solution in the molten or semi-molten thermoplastic resin. The blowing agent can, however, be one, such as pentane or a pentane fraction, which is a liquid under normal conditions. Examples of volatile substances that can be used include lower aliphatic hydrocarbons such as methane, ethane, ethylene, propene, a butane, a butylene, or a pentane; lower alkyl halides such as methyl chloride, trichloromethane, dichlorodifluoromethane or 1,2-dichlorotetrafluoroethane; acetone, and inorganic gases such as carbon dioxide or nitrogen. For producing a foamed sheet having a density of 1 to 10 pounds per cubic foot the preferred blowing agent is isobutylene, while for higher densities such as 10 to 50 pounds per cubic foot a mixture of isobutylene and a chlorofluorocarbon has been found very suitable. The blowing agent can also be a chemical blowing agent, which can for example be a bicarbonate such as for example sodium bicarbonate or ammonium bicarbonate, or an organic nitrogen compound that yields nitrogen on heating, such as for example dinitrosopentamethylenediamine or barium azodicarboxylate. The amount of blowing agent depends upon its nature and the density desired in the foamed resin. From 3 to 30 per cent, especially 7 to 20 per cent by weight based on the weight of the resin is often a suitable proportion of blowing agent, and for example there can be used from 10 to 15 per cent by weight of butane in conjunction with polyethylene. When nitrogen or a chemical blowing agent is used much smaller quantities may be employed, such as for example up to 1 per cent by weight. The blowing agent can be mixed with the resin in several ways; for example, particles of the resin can be dusted with the blowing agent where this is a solid, or steeped in it if it is a liquid, before being fed to the extruder. A preferred method where the blowing agent is a volatile substance and the extruder is of the screw type is to inject the blowing agent under pressure into the extruder barrel.

Preferably, the resin also contains a nucleating agent, which assists in the formation of a large number of fine cells. A wide range of nucleating agents can be employed, including finely divided inert solids such as for example silica, talc or alumina, perhaps in conjunction with zinc stearate, or small quantities of a substance that decomposes at the extrusion temperature to give a gas, such as for instance carbon dioxide, can be used. An example of the latter class of nucleating agents is sodium bicarbonate, used if desired in conjunction with a weak acid such as, for example, tartaric or citric acid. Boric acid is also an effective nucleating agent. A small proportion of the nucleating agent, for example, up to 5 per cent by weight of the resin, is usually effective.

The extrusion temperature (that is the temperature of the slit die orifice) depends to some extent on the softening point and rheological properties of the resin, but in general temperatures between 90°C. and 220°C., preferably between 95°C. and 160°C. are suitable. For example, when foamable polyethylene is being extruded a temperature in the range 95°C. to 140°C. is often very suitable. Somewhat higher temperatures, for example 150°C. to 180°C., are desirable for an acrylonitrile-butadiene-styrene copolymer resin.

Extrusion pressures for example greater than 250 pounds per square inch, and especially between 250 and 6,000 pounds per square inch, can be employed. Preferably, the pressure is between 300 and 4000 pounds per square inch.

The resin foams while it passes through the expansion zone. Side pieces may be used to prevent or limit sideways expansion, that is to say, in a direction parallel to the slit, but it is usually found that these are unnecessary because sideways expansion is inhibited by haul off and the frictional drag of the moving convex surface. This condition can be met by maintaining the temperature of the surface below the softening point of the foamable resin but not so low as to prevent the layer from foaming, and in fact expansion under these conditions takes place both forwards and across the gap width of the expansion zone. This give rise to a good cell structure. On the other hand, too high a surface temperature may cause sticking. Temperature control of the convex surface, for instance where it is a roller, can, for example, be achieved by the circulation of fluid through the roller or through a chamber contained in the roller. Control of temperature can also be achieved by internal air cooling of the surface, or by air cooling of that part of a rotating roller surface not in contact with the foaming resin. Moreover, a jet of air can be played on the foamed resin after it has left the expansion zone.

The temperature of the concave surface also needs to be controlled and preferably the temperature is such that there is formed a "skin" of relatively dense foamed resin that slips past the concave surface; this results in an excellent surface finish on the extruded sheet and with a similar skin on the other side of the sheet gives a sandwich structure. The concave surface is preferably fluid-cooled as shown in the drawing, although cooling fins, if necessary assisted by a fan, may sometimes be useful. The temperatures or ranges of temperatures chosen for the two surfaces can but need not be the same. They partly depend on the nature of the resin and the temperature of the resin as it leaves the die orifice. For example, the preferred temperature range in the case of polypropylene or polyethylene is from 20° to 70°C., for polystyrene 20° to 120°C. and for ABS 20° to 130°C.

The dimensions of the slit die orifice can be chosen from within wide limits depending on those desired in the extruded product. The length of the die orifice can be for instance from 0.5 inch to 60 inches or more. Often this dimension is between 1 inch and 24 inches. The gap of the die orifice (that is to say the distance between its opposite faces) is not usually greater than 0.2 inch; very often a gap between 0.005 and 0.1 inch, for example from 0.01 to 0.08 inch, will be found suitable. The other dimension of the die orifice is its land, which is measured in the direction of extrusion, and this can for example be from 0 up to 2 inches.

The extruded resin preferably meets the convex surface at an angle to the tangent of the convex surface opposite the slit die orifice. Preferably, this angle is from 45° to 90°, for example from 50° to 80°, although it can be less, for example from 10° or 30° to 45°. The angle is preferably in the range of from 20° to 50° when the surface is that of an undriven roller.

The concave and convex surfaces are such that they contact the expanding and foaming resin. It has been mentioned that they are preferably cylindrical, and this applies particularly to the convex surface which, as has been stated, is preferably that of a rotating roller. However, curved surfaces having other cross-sections, for example a parabola (or more preferably a succession of two or more cylindrical surfaces of increasing radii) are possible, particularly for the concave surface. Moreover, a moving noncylindrical convex surface can also be arranged by passing a flexible belt over a fixed surface having the desired shape. However, cylindrical surfaces are easier to make and therefore are definitely preferred, and radii of from 0.25 to 2 inches, preferably 0.5 to 1 inch, are usually suitable for the concave surface while radii from 0.5 to 10 inches, preferably 1 to 4 inches, are more usually suitable for the convex surface. Preferably, where the radius of one surface is at one end of the range, the radius of the other surface is at the similar end of its range. Where the convex surface is that of a roller, the practical lower limit of its radius is normally that imposed by its physical strength, since too thin a roller can be bent by the pressure of the foaming resin. The practical upper limit is normally associated with the necessity to fit the roller in close juxtaposition to the slit die orifice without cutting away too much metal from the die lip.

The surfaces are normally and preferably positioned so that their distance apart increases along the path of the extruding resin. The best relative position is found by experiment, and to assist in this it is desirable for the position of the convex surface to be adjustable, the concave surface preferably being integral with the slit die orifice. For cylindrical surfaces of the radii mentioned above (or for non-cylindrical surfaces of a similar degree of curvature), it has been found that a useful position can be found with their centers approximately as described above with reference to the drawing and between 0.75 and 2 inches apart, depending on the particular radii employed. Also for the radii mentioned above, the length of the expansion zone along the path of the foaming resin is preferably between 0.2 and 2 inches, especially between 0.3 inch and 1 inch, for instance about 0.5 inch. At the zone exit the distance between the two surfaces is preferably substantially equal to the desired sheet thickness, foaming normally being substantially complete at this point. On the other hand, the zone should not be so long that the foaming resin is excessively cooled; this will result in a blistered surface.

For mechanical reasons the moving convex surface needs to be spaced from the slit die orifice and the amount of this spacing also needs to be determined experimentally under operating conditions. Often this spacing is less than 0.1 inch, for example from 0.002 to 0.01 inch, and for instance a relatively narrow spacing, for example from 0.001 to 0.005 inch, is usually desirable. Rather careful adjustment may be needed to find the best value for a particular density and thickness.

The most important criteria for satisfactory operation are freedom from corrugation and excellent surface finish in a sheet of the desired thickness and density.

Where the convex surface is that of a roller, the roller itself is rotatable and may be idle or driven. Preferably, however, the roller or other form of movable convex surface is driven by a variable speed motor. Due to the frictional drag of the resin to the convex surface when foaming is occuring, and also due to the haul-off speed where this is sufficiently great, there is little tendency for the resin to expand sideways on the surface of the roller. Thus, the sheet thickness can be influenced by variation of the haul-off and roller speeds which control the relative expansions in the direction parallel to the slit and across the zone (that is, in the direction normal to the sheet). The linear speeds of the convex surface and haul-off are each preferably in the range of 0.9 to 3 times that of the extruding unfoamed resin, and are preferably maintained substantially constant during the extrusion operation at a rate that ensures the expansion zone is completely filled with expanding resin. When the convex surface is a roller a convenient speed is from 0.5 to 16 feet per minute, more preferably from 1 to 10 feet per minute, such as for example, about 2 feet per minute. The most appropriate value will often depend on the speed of the extruding unfoamed resin and the relative position of the roller with respect to the concave surface. The rate of haul-off is often maintained within the range of from 0.5 to 18 feet per minute, especially from 1 to 11 feet per minute, such as for example 3 feet per minute. Again the most appropriate value will often depend on the speed of the extruding unfoamed resin.

Foaming of the resin normally takes place as soon as it issues from the slit die orifice and continues while the sheet is in contact with the surfaces and expanding across the zone. It is preferably substantially completed where the sheet leaves the zone, but a small degree of foaming may continue to occur while the sheet is being drawn away from the zone exit. Preferably, the sheet is maintained in contact with the convex surface for a short distance after it leaves the zone; this distance can for instance be between 2 and 4 inches and very often corresponds to about one quarter of the circumference of a cylindrical roller where this provides the convex surface. Withdrawal of the foamed resin sheet can be by means of conventional extrusion haul-off mechanism, for example a roller nip or a series of roller nips, Caterpiller (registered Trade Mark) mechanism, and so on, and preferably takes place at a speed that, as explained above, minimizes sideways expansion of the foaming resin within the zone.

The foamed resin sheet produced preferably has a predominantly closed cell structure (that is to say, the majority of the cells in the foam are closed) and cells can, for example, have a diameter of from 0.001 to 0.12 inch. Preferably, the average cell diameter is fairly small, for instance from 0.002 inch to 0.02 inch. Because most of the expansion on foaming occurs in the extrusion direction and across the zone, the cells are normally substantially spherical. By arranging for most expansion to take place across the zone, the cells can be elongated in a direction normal to the sheet surface; this elongation is controllable to some extent by adjusting the speed and position of the moving convex surface and can be of value in increasing the compressive strength of the sheet.

The density of the foam can be chosen from within wide limits; for example it can be from 0.5 pounds per cubic foot or even less, to 55 pounds per cubic foot or more. For example, the process can be used to make a foamed ABS sheet having a density at about the middle of this range, densities of from 10 to 50 pounds per cubic foot, for example about 20 to 40 pounds per cubic foot, being often very suitable. Foamed polypropylene or foamed polystyrene sheet of similar density, or on the other hand, of much lower density, for example, 0.75 to 5 pounds per cubic foot, can also be made by the process of the invention.

The foamed resin sheet produced is an excellent material finding many applications, for example, as thermal insulation, as a wall or ceiling panelling material or (when formed to shape) as a body panel or part shell of an automobile, boat or article of furniture or container. It is conveniently produced with a width of between 6 and 48 inches and with a thickness of between 0.02 to 0.5 inches. The sheet may be further processed for example by calendering, and a glossy or matt surface imparted to either surface. Moreover, the sheet can be shaped by vacuum or pressure forming or by matched dies, embossed with a suitable design or laminated with other materials such as for example paper or a glossy film. Examples of articles that can be produced from the sheet by a forming process are trays, containers for packaging food for instance, or drinking cups of the kind employed in automatic vending machines. Embossing can be effected directly if desired by employing a patterned roller as the convex surface.

The invention is illustrated by the following Examples.

EXAMPLE 1

This Example describes a process according to the invention for the production of a foamed acrylonitrile/-butadiene/styrene copolymer resin.

Acrylonitrile/butadiene/styrene copolymer (ABS) resin (density 1.06 g/cc. and melt flow index 2.7 g/10 min. at 230°C. and 5 kg. weight) was blended with 2 percent by weight of talc as nucleating agent and fed to a plasticating extruder of barrel diameter 2½ inches at a rate of 32 kilograms per hour. The plasticized resin was then fed into another extruder equipped with means for injecting fluids under pressure and a screw designed for mixing of injected fluid with the resin as well as means for cooling the resulting mixture. At its front end the extruder was fitted with a 17-inch-wide die block, die lips and rollers as described above with reference to the drawing and also with a conventional caterpiller haul-off mechanism. The radius of the concave surface was 0.75 inch and the roller 8 was of diameter 3.4 inch and length 20.25 inches. The expansion zone extended about 0.6 inch along the direction of resin flow and its exit gap was adjustable (by varying the position of the roller) within the range 0.1 to 0.5 inch.

Dichlorodifluoromethane as blowing agent was injected into the resin at a rate of 0.84 kilograms per hour at a point before the mixing zone of the second extruder, the temperature end pressure of the resin at this point being 234°C. and 1900 pounds per square inch gauge respectively. Further, carbon dioxide gas at 600 pounds per square inch gauge was injected as a second blowing agent at the junction of the mixing and cooling zones, the temperature at the carbon dioxide injection point being about 199°C. The mixture of the resin and the blowing agents was then cooled as it moved along the extruder and was at about 180°C. at the die entry. The pressure at the die entry was 3,400 pounds per square inch gauge and the die body temperature was maintained at 170°C. The gas of the slit die orifice was adjusted to 0.010 inch. The die lips were heated by circulating steam at 70 pounds per square inch gauge pressure. Water at 92°C. was circulated through channel 13 and at 22°C. through the roller 8. In a series of experiments, the roller 8 was driven at different speeds and the haul-off speed was also varied. The resulting foam sheets of density about 35 pounds per cubic foot were about 17 inches wide and of thicknesses between 0.065 and 0.140 inch depending on the speed of the roller 8 and its position relative to the concave surface, as well as the sheet haul-off speed. The density of the foam could also be varied by changing the amount of blowing agent, for example between 35 and 55 pounds per cubic foot. The foam sheets had a sandwich structure with the lowest density foam at the center and almost unfoamed polymer at the surface. The two faces of each of the sheets were very smooth and glossy.

EXAMPLE 2

In this Example the blowing agent system of the previous Example was replaced by a mixture of isobutylene and dichlorodifluoromethane.

The isobutylene was injected at a rate of 1.87 percent by weight of the resin at the point before the mixing zone, and the dichlorodifluoromethane at a rate of 3.65 percent at the junction of the mixing and cooling zones of the second extruder. The plasticizing action of isobutylene helped to reduce the polymer temperature at die entry to 172°C. but the other operating conditions were similar to those of Example 1. A foam sheet, 16½ inches wide of thickness 0.14 inch and density 29 pounds per cubic foot was produced. The sheet had smooth surfaces top and bottom.

EXAMPLE 3

This Example describes a process according to the ivention employing an ABS resin of higher melt flow index than that used in the preceding Examples.

A blend of ABS resin (density = 1.06 g/cc. and melt flow index = 4 g/10 min. at 2302°C. and 5 kg. weight) with 2 percent by weight talc was extruded through the same extrusion system as described in Example 1 and using a mixture of dichlorodifluoromethane and isobutylene as blowing agent as described in Example 2. The temperature of the melt at the isobutylene injection point was 229°C. and that at the dichlorodifluoromethane injection point 190°C. The melt temperature at die entry was about 170°C. The die block temperature was maintained at 170°C. Steam at 70 p.s.i.g. pressure was circulated through channel 12 and water at 47°C. was circulated through channel 13. The temperature of roller 8 was maintained slightly above the ambient by circulating cooling water through it. The top of the emerging foam sheet was cooled by a jet of air. The resulting foam sheet was 16½ inches wide, 0.15 inch thick and of density 34 pounds per cubic foot. The sheet had very smooth glossy surfaces and a foam sandwich structure as described in Example 1.

EXAMPLE 4

This Example describes a process according to the invention for the production of an embossed foamed polystyrene sheet of relatively low density.

The apparatus employed was the same as that used in Example 1 except that the roller 8 had an incised pattern in its cylindrical surface. Polypropylene resin of density 0.905 g/cc. and melt flow index 1.5 g/10 min. (at 230°C. and 2.16 kg. weight) was blended with 2 percent by weight of talc as nucleating agent and fed to the plasticating extruder at a rate of 25 kilograms per hour. Isobutylene was injected into the second extruder at a rate of 3 kilograms per hour, the resin temperature at the injection point being 220°C. and the pressure 1,800 pounds per square inch gauge. At the entrance to the die the resin temperature was 130°C., and pressure 1900 pounds per square inch gauge. The channels in the die body and lips were fed with steam at 40 pounds per square inch gauge, the die body temperature being 142°C. The concave surface was cooled by passing water at 90°C. through its cooling channel while the roller was cooled with water at 20°C. The gap of the slit die orifice was adjusted to 0.01 inch. The speed of the roller was adjusted so that its peripheral speed was the same as the linear speed of the foaming resin through the expansion zone, and there was produced a sheet of foamed polypropylene of density 2.5 pounds per cubic foot, having a width 43 cms. and thickness 9.5 mm. and embossed with a pattern corresponding to that of the roller surface.

EXAMPLE 5

This Example describes a further process according to the invention for the production of a foamed acrylonitrile/butadiene/styrene copolymer resin.

Acrylonitrile/butadiene/styrene copolymer (ABS) resin (density 1.06 g/cc. and melt flow index 2.7 g/10 min. at 230°C. and 5 kg. weight) was blended with 3 percent by weight of talc as nucleating agent and fed to a plasticating extruder of barrel diameter 2½ inches at a rate of 40.3 kilograms per hour. The plasticized resin was then fed into another extruder equipped with means for injecting fluids under pressure and a screw designed for mixing of injected fluid with the resin as well as means for cooling the resulting mixture. At its front end the extruder was fitted with a 17-inch-wide die block, die lips and rollers as described above with reference to the drawing, and also with a conventional caterpillar haul-off mechanism. The radius of the concave surface was 0.75 inch and the roller 8 was of diameter 3.4 inch and length 20.25 inches. The expansion zone extended about 0.6 inch along the direction of resin flow and its exit gap was adjustable (by varying the position of the roller) within the range 0.1 to 0.5 inch.

Isobutylene and dichlorodifluoromethane as blowing agents were injected into the resin at rates of about 0.84 and 0.96 kilograms per hour, respectively, at a point before the mixing zone of the secured extruder, the temperature and pressure of the resin at this point being 230°C. and 2,000 pounds per square inch gauge respectively. The mixture of the resin and the blowing agent was then cooled as it moved along the extruder and was at about 175°C. at the die entry. The pressure at the die entry was 2,500 pounds per square inch gauge and the die body temperature was maintained at about 177°C. The gap of the slit die orifice was adjusted to 0.010 inch. The die lips were heated by circulating steam at 45 and 30 pounds per square inch gauge pressure through the top and bottom lips respectively. Water at 46°C. was circulated through channel 13 and at 22°C. through the roller 8. The top surface of the emerging foam sheet was further cooled by an air knife. The roller 8 was driven at a speed of 2.9 feet per minute and the haul-off speed was maintained at 3.5 feet per minute. The resulting foam sheets of density 480 grams per liter were about 17 inches wide and an average thickness of about 0.123 inch. The density of the foam could also be varied by changing the amount of blowing agent. The foam sheets had a sandwich structure with the lowest density foam at the center and almost unfoamed polymer at the surface. The two faces of each of the sheets were very smooth and glossy.

EXAMPLE 6

This Example describes a process according to the invention for the production of a pigmented foamed acrylonitrile/butadiene/styrene copolymer resin.

Acrylonitrile/butadiene/styrene copolymer (ABS) resin (density 1.06 g/cc. and melt flow index 4 g/10 min. at 230°C. and 5 kg. weight) containing 5 percent by weight of the resin of titanium dioxide was blended with 3 percent by weight of talc as nucleating agent and fed to a plasticating extruder of barrel diameter 2½ at a rate of 38.6 kilograms per hour. The plasticized resin was then fed into another extruder equipped with means for injecting fluids under pressure and a screw designed for mixing of injected fluid with the resin as well as means for cooling the resulting mixture. At its front end the extruder was fitted with a 17-inch-wide block, die lips and rollers as described above with reference to the drawing, and also with a conventional caterpillar haul-off mechanism. The radius of the concave surface was 0.75 inch and the roller 8 was of diameter 3.4 inch and length 20.25 inches. The expansion zone extended about 0.6 inch along the direction of resin flow and its exit gap was adjustable (by varying the position of the roller) within the range 0.1 to 0.5 inch.

Isobutylene and dichlorodifluoromethane as blowing agents were injected into the resin at rates of about 1.14 and 1.68 kilograms per hour, respectively, at a point before the mixing zone of the second extruder, the temperature and pressure of the resin at this point being 230°C. and 2,000 pounds per square inch gauge respectively. The mixture of the resin and the blowing agents was then cooled as it moved along the extruder and was at about 175°C. at the die entry. The pressure at the die entry was 2,500 pounds per square inch gauge and the die body temperature was maintained at 176°C. The gap of the slit die orifice was adjusted to 0.010 inch. The die lips were heated by circulating steam at 40 pounds per square inch gauge pressure. Water at 48°C. was circulated through channel 13 and at 22°C. through the roller 8. The top surface of the emerging foam sheet was further cooled by an air knife. The roller 8 was driven at a speed of 2.6 feet per minute and the haul-off speed was maintained at 3.5 feet per minute. The resulting foam sheets of density 435 grams per liter were about 17 inches wide and an average thickness of about 0.134 inch. The density of the foam could also be varied by changing the amount of blowing agent. The foam sheets had a sandwich structure with the lowest density foam at the center and almost unfoamed polymer at the surface. The two faces of each of the sheets were very smooth and glossy.

EXAMPLE 7

This Example describes a process according to the invention for the production of a foamed acrylonitrile/butadiene/styrene copolymer resin. It also demonstrates the control that can be obtained over the product thickness by adjustment of the single roller and haul-off speeds.

Acrylonitrile/butadiene/styrene copolymer (ABS) resin (density 1.06 g/cc. and melt flow index 4 g/10 min. at 230°C. and 5 kg. weight) was blended with 3 percent by weight of talc as nucleating agent and fed to a plasticating extruder of barrel diameter 2½ inches at a rate of 36.9 kilograms per hour. The plasticized resin was then fed into another extruder equipped with means for injecting fluids under pressure and a screw designed for mixing of injected fluid with the resin as well as means for cooling the resulting mixture. At its front end the extruder was fitted with a 17-inch-wide die block, die lips and rollers as described above with reference to the drawing, and also with a conventional caterpillar haul-off mechanism. The radius of the concave surface was 0.75 inch and the roller 8 was of diameter 3.4 inch and length 20.25 inches. The expansion zone extended about 0.6 inch along the direction of resin flow and its exit gap was adjustable (by varying the position of the roller) within the range 0.1 to 0.5 inch.

Isobutylene and dichlorodifluoromethane as blowing agents were injected into the resin at rates of about 0.84 and 1.02 to 1.8 kilograms per hour, respectively, at a point before the mixing zone of the second extruder, the temperature and pressure of the resin at this point being 234°C. and 2,000 pounds per square inch gauge respectively. The mixture of the resin and the blowing agents was then cooled as it moved along the extruder and was at about 176°C. at the die entry. The pressure at the die entry was 2,700 pounds per square inch gauge and the die body temperature was maintained at 178°C. The gap of the slit die orifice was adjusted to 0.010 inch. The die lips were heated by circulating steam at 50 pounds per square inch gauge pressure. Water at 44°C. was circulated through channel 13 and at 22°C. through the roller 8. The top surface of the emergent foam sheet was futher cooled by an air knife. In a series of experiments, the roller 8 was driven at different speeds between 2.9 and 3.87 feet per minute and the haul-off speed was also varied between 2.5 and 4.9 feet per minute. The resulting foam sheets of density within the range of 424 to 507 grams per liter were about 17 inches wide and of thicknesses between 0.120 and 0.141 inch depending on the speed of the roller 8 and its position relative to the concave surface, as well as the sheet haul-off speed. Details of these factors in a number of experiments are given in the Table below. The density of the foam was also varied by slight alterations in the amount of the dichlorofluoromethane blowing agent. The foam sheets had a sandwich structure with the lowest density foam at the center and almost unfoamed polymer at the surface. The two faces of each of the sheets were very smooth and glossy. The following results demonstrate the versatility of the process and the good degree of control over product thickness that can be obtained.

| Roller Speed (feet per minute) | Haul-off speed (feet per minute) | Sheet thickness (inch) | Density (grams per liter) |
|---|---|---|---|
| 2.9 | 2.5 | 0.141 | 436 |
| 2.9 | 2.7 | 0.131 | 507 |
| 2.9 | 3.9 | 0.131 | 442 |
| 2.9 | 4.6 | 0.120 | 446 |
| 2.9 | 4.9 | 0.124 | 420 |
| 3.0 | 3.9 | 0.136 | 429 |
| 3.1 | 3.1 | 0.137 | 450 |
| 3.18 | 3.5 | 0.130 | 460 |
| 3.35 | 3.9 | 0.134 | 469 |
| 3.6 | 3.9 | 0.132 | 424 |
| 3.7 | 3.9 | 0.130 | 485 |
| 3.87 | 3.9 | 0.131 | 447 |

What is claimed is:

1. An apparatus suitable for the extrusion of a sheet of foamed thermoplastic resin, comprising a slit die orifice communicating with an expansion zone defined by a pair of opposing curved surfaces that can be cooled, one of the surfaces being a convex surface that can move in a direction away from the slit die orifice and the other surface being concave, the curvatures and relative spacing of the opposing curved surfaces with respect to each other being such that the space between said curved surfaces is at a minimum at the beginning of said expansion zone proximate said slit die orifice and said spacing progressively increases in a direction away from said slit die orifice to a maximum at the end of said expansion zone, with the result that when a foamable resin is extruded through the die the opposing curved surfaces contact the expanding and foaming resin and there is produced a foamed resin sheet.

2. An apparatus according to claim 1, in which the concave surface is fixed with respect to the slit die orifice.

3. An apparatus according to claim 1, in which each opposing curved surface is the locus of a straight line parallel to the slit die orifice.

4. An apparatus according to Claim 3, in which each opposing curved surface is cylindrical.

5. An apparatus according to claim 4, in which the convex surface is a roller rotatable about an axis parallel to the slit.

6. An apparatus according to claim 4, in which the cylindrical concave surface has a radius of 0.5 to 1 inch.

7. An apparatus according to claim 4, in which the cylindrical convex surface has a radius of 1 to 4 inches.

8. An apparatus according to claim 4, in which the centers of the cylindrical surfaces are between 0.75 and 2 inches apart.

9. An apparatus according to claim 4, in which the length of the expansion zone along the path of the foaming resin is between 0.3 and 1 inch.

* * * * *